United States Patent
Yahagi et al.

(10) Patent No.: US 10,866,435 B2
(45) Date of Patent: Dec. 15, 2020

(54) OPTICAL FILM FOR EYEWEAR WITH LIGHT CONTROL, LIGHT REFLECTION, AND POLARIZATION LAYERS

(71) Applicant: NIPPON KAYAKU KABUSHIKI KAISHA, Tokyo (JP)

(72) Inventors: Yoshiyuki Yahagi, Tokyo (JP); Kouichi Tanaka, Tokyo (JP); Saki Abe, Tokyo (JP); Yuki Aikawa, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 16/151,477

(22) Filed: Oct. 4, 2018

(65) Prior Publication Data

US 2019/0033620 A1 Jan. 31, 2019

Related U.S. Application Data

(63) Continuation of application No. PCT/JP2017/014377, filed on Apr. 6, 2017.

(30) Foreign Application Priority Data

Apr. 8, 2016 (JP) .................. 2016-078364

(51) Int. Cl.
*G02B 5/30* (2006.01)
*G02C 7/12* (2006.01)
(Continued)

(52) U.S. Cl.
CPC ................ *G02C 7/12* (2013.01); *B32B 7/02* (2013.01); *G02B 5/3025* (2013.01); *G02C 7/10* (2013.01); *G02C 2202/16* (2013.01)

(58) Field of Classification Search
CPC ...... G02B 5/30; G02B 5/3016; G02B 5/3025; G02B 27/28; G02B 27/286; G02C 7/00;
(Continued)

(56) References Cited

U.S. PATENT DOCUMENTS 9,151,959 B2 * 10/2015 Dike ...................... G02B 30/56
2004/0011994 A1 1/2004 Yumoto et al.
(Continued)

FOREIGN PATENT DOCUMENTS

EP 3 165 949 A1 5/2017
JP 2001-180200 A 7/2001
(Continued)

OTHER PUBLICATIONS

International Search Report for corresponding International Application No. PCT/JP2017/014377 dated Jul. 4, 2017.
(Continued)

*Primary Examiner* — Arnel C Lavarias
(74) *Attorney, Agent, or Firm* — Pearne & Gordon LLP

(57) ABSTRACT

An optical film for eyewear includes a first light control layer, at least one light reflection layer, a second light control layer, and a linear polarization element layer in this order from an outer side with respect to a viewer. The light reflection layer includes a cholesteric liquid crystal layer that reflects left-handed circularly polarized light or right-handed circularly polarized light in a visible light range, and the first light control layer and the second light control layer are each a quarter wave plate.

7 Claims, 9 Drawing Sheets

(51) Int. Cl.
    *B32B 7/02*     (2019.01)
    *G02C 7/10*     (2006.01)

(58) Field of Classification Search
    CPC .... G02C 7/02; G02C 7/12; G02F 1/13; G02F 1/133528; G02F 2001/133531; G02F 2001/133541; G02F 2001/133543
    USPC .............. 359/601, 609, 613, 483.01, 487.01, 359/487.02, 487.06, 488.01, 489.01, 359/489.07, 489.14, 489.2, 491.01, 359/493.01; 351/41, 44, 49; 349/96, 98, 349/177, 179, 193, 194
    See application file for complete search history.

(56) References Cited

U.S. PATENT DOCUMENTS

| | | |
|---|---|---|
| 2004/0263736 A1 | 12/2004 | Graham et al. |
| 2005/0078245 A1 | 4/2005 | Sasaki et al. |
| 2007/0052886 A1 | 3/2007 | Fan et al. |
| 2007/0228325 A1 | 10/2007 | Yumoto |

FOREIGN PATENT DOCUMENTS

| | | |
|---|---|---|
| JP | 2002-179668 A | 6/2002 |
| JP | 2003-306491 A | 10/2003 |
| JP | 2003-313292 A | 11/2003 |
| JP | 2003-315556 A | 11/2003 |
| JP | 2004-029824 A | 1/2004 |
| JP | 2006-011281 A | 1/2006 |
| JP | 2007-271808 A | 10/2007 |
| JP | 2009-288312 A | 12/2009 |
| JP | 2013-200452 A | 10/2013 |
| WO | 2016/002582 A | 1/2016 |

OTHER PUBLICATIONS

Written Opinion for corresponding International Application No. PCT/JP2017/014377 dated Jul. 4, 2017.
English Translation of Written Opinion for corresponding International Application No. PCT/JP2017/014377 dated Jul. 4, 2017.
International Preliminary Report on Patentability for corresponding International Application No. PCT/JP2017/014377 dated Oct. 9, 2018.
Japanese Office Action dated Jul. 29, 2020 for corresponding Japanese Application No. 2018-510660 and English translation.

* cited by examiner

OPTICAL FILM FOR EYEWEAR WITH LIGHT CONTROL, LIGHT REFLECTION, AND POLARIZATION LAYERS

CROSS REFERENCE TO RELATED APPLICATIONS

This is a continuation application of International Patent Application No. PCT/JP2017/014377 filed Apr. 6, 2017, which claims the benefit of Japanese Patent Application No. 2016-078364 filed Apr. 8, 2016, the full contents of all of which are hereby incorporated by reference in their entirety.

BACKGROUND

Technical Field

The present disclosure relates to an optical film used in eyewear (such as sunglasses, goggles, and a helmet visor), and an optical laminate and eyewear using the optical film.

Background

Eyewear (such as sunglasses, goggles, and a visor) is used to reduce brightness due to reflected light from, for example, a water surface, a road surface, or a snow surface. For example, lenses of sunglasses are colored by pigment or the like so that reflected light is absorbed by the pigment. Accordingly, the amount of light incident on eyes of the wearer of the sunglasses is reduced, and thus brightness is reduced. However, typically, light reflected at a water surface or a snow surface becomes polarized light, and thus polarization sunglasses are effective particularly for this reflected light. Polarization sunglasses are designed to effectively absorb (cut) light in the polarization direction of the polarized reflected light, thereby reducing brightness and improving visibility.

In an optical film used in polarization sunglasses, typically, a polarization element is sandwiched between support bodies made of a plastic material such as polycarbonate. Polarization sunglasses can be produced by fabricating the optical film having such a configuration into a desired shape and fitting the optical film to a frame. The polarization element is a film in which what is called a dichromatic pigment such as a dichromatic dye or an iodine-rich polyvinyl alcohol (PVA) complex is uniaxially oriented together with polymer such as PVA. Linear polarization elements in various colors can be obtained depending on the color of used pigment. Most of typical sunglasses are colored with gray colors to have polarization characteristics across the entire visible light range.

The surface of each lens is coated with a multi-layered film by evaporation in some cases to achieve a desired design of polarization sunglasses or further improvement of visibility. When the multi-layered film is provided, light reflected at the lens surface is visually recognized in blue, green, and red metallic color tones by others not wearing polarization sunglasses, and view with reduced brightness and further improved visibility is obtained through the lens by the wearer of polarization sunglasses because particular polarized light is reflected. Thus, the multi-layered film is useful in terms of the visibility for the wearer. However, sebum or the like adhering to the multi-layered film on the lens surface is hard to remove, which causes handling difficulties. In addition, the multi-layered film is likely to peel off at a place such as sea where polarization sunglasses are exposed to moisture and salt air, and thus lacks an adhesion property. Furthermore, when a spherical lens for eyewear is coated with a multi-layered film by evaporation, it is difficult to achieve uniform evaporation coating on a flat site and a curved site, which causes manufacturing difficulties.

Such problems can be solved by providing a multi-layered film on the inner side of a support body, in other words, between a polarization element and the support body. However, the multi-layered film has reflection performance based on a refractive index difference between layers. Thus, when the multi-layered film is provided between the polarization element and the support body, it is difficult for the multi-layered film to obtain reflection performance equivalent to that at an air interface on the outside. In addition, the multi-layered film is made of an inorganic material, which makes it difficult to achieve bonding with the polarization element as an organic substance.

Japanese Patent Application Laid-Open No. 2001-180200 discloses a method of obtaining reflected light in a metallic color tone by using an organic substance without a multi-layered film. In this method, an optical laminate includes a cholesteric liquid crystal layer, and a light modulation layer containing a pigment or a dye. Cholesteric liquid crystal is liquid crystal molecules in a helically oriented state, and has a function to selectively reflect a circularly polarized light component in a direction same as the helical direction of the liquid crystal molecules in a particular wavelength band depending on the length of a helical pitch. Japanese Patent Application Laid-Open No. 2001-180200 discloses that the optical laminate, which includes the cholesteric liquid crystal layer in which the orientation of such cholesteric liquid crystal is fixed, and the light modulation layer, exhibits a vivid color tone and is excellent in ornamentation.

Cholesteric liquid crystal has a circularly polarized light selective reflection characteristic that selectively reflects a circularly polarized light component in a particular wavelength band. In other words, transmitted light is only circularly polarized light in a cholesteric liquid crystal layer. Thus, when the cholesteric liquid crystal layer disclosed in Japanese Patent Application Laid-Open No. 2001-180200 is combined with a polarization element of conventional polarization sunglasses, the polarization element cannot sufficiently absorb transmitted light of circularly polarized light, which leads to increase of light leakage from the polarization element. This degrades the original function of the polarization sunglasses, and reduces an antiglare effect.

SUMMARY

The present disclosure is related to providing an optical film for eyewear that reduces degradation of an antiglare effect due to circularly polarized light in eyewear such as polarization sunglasses including a cholesteric liquid crystal layer and is applicable to eyewear that exhibits reflected light in a metallic color tone, and an optical laminate and eyewear using the optical film.

According to a first aspect of the present disclosure, an optical film for eyewear includes a first light control layer, at least one light reflection layer, a second light control layer, and a linear polarization element layer in this order from an outer side with respect to a viewer. The light reflection layer includes a cholesteric liquid crystal layer that reflects left-handed circularly polarized light or right-handed circularly polarized light in a visible light range, and the first light control layer and the second light control layer are each a quarter wave plate.

Further, it is preferable that in the optical film, two or more light reflection layers are laminated and each of the two or more laminated light reflection layers reflects circularly polarized light in an identical direction.

Further, it is preferable that a slow axis of the first light control layer is arranged in a direction in which s-polarized light incident on the first light control layer is converted into circularly polarized light in a direction the same as the direction of circularly polarized light reflected by the light reflection layer.

Further, it is preferable that the first light control layer and the second light control layer are laminated in a positional relation that slow axes of the quarter wave plates are orthogonal to each other.

According to a second aspect of the present disclosure, an optical laminate includes a first support body, a second support body, and the optical film according to the present disclosure arranged between the first support body and the second support body.

Further, it is preferable that the first support body and the second support body are each a substrate made of a plastic material.

According to a third aspect of the present disclosure, an eyewear includes the optical film according to the present disclosure or the optical laminate according to the present disclosure.

An optical film for eyewear according to the present disclosure and an optical laminate using the optical film can be used to provide eyewear such as polarization sunglasses that reduces degradation of an antiglare effect due to circularly polarized light and exhibits reflected light in a metallic color tone when the optical film includes a cholesteric liquid crystal layer.

The optical film according to the present disclosure is applicable to medical glasses and the like. For example, the optical film according to the present disclosure in which each light reflection layer has a central wavelength of 500 nm or shorter is applicable to protective glasses and the like for reducing brightness after a cataract operation.

DETAILED DESCRIPTION

Embodiments of the present disclosure will be described below with reference to the accompanying drawings. The following embodiments are merely some typical exemplary embodiments of the present disclosure, and various kinds of additional changes may be performed within the scope of the present disclosure.

<Optical Film>

Figure 1:
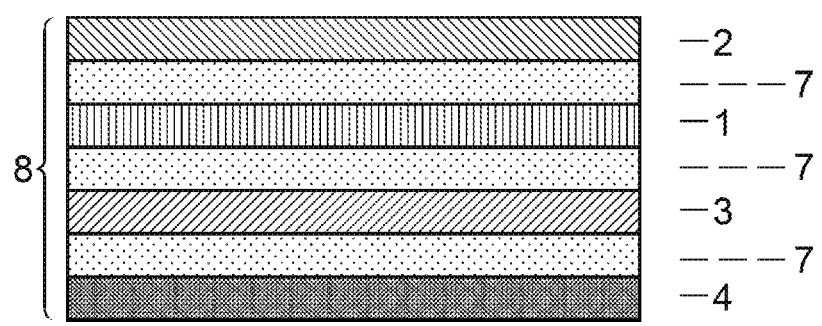
FIG. 1 is a side sectional view illustrating a representative embodiment of an optical film according to the present disclosure.

An optical film for eyewear according to the present disclosure includes at least one light reflection layer, two quarter wave plates as light control layers, and a linear polarization element layer. The light reflection layer includes a cholesteric liquid crystal layer that reflects left-handed circularly polarized light or right-handed circularly polarized light in a visible light range. Specifically, the optical film for eyewear according to the present disclosure includes a first light control layer, the light reflection layer, a second light control layer, and the linear polarization element layer in this order from an outer side with respect to a viewer. In other words, the first light control layer (quarter wave plate), the at least one light reflection layer, the second light control layer (quarter wave plate), and the linear polarization element layer are laminated in this order when the optical film for eyewear is viewed from the front side. The outer side with respect to a viewer (or wearer) of eyewear is a side on which light is incident on the optical film when the optical film is applied to the eyewear. The outer side corresponds to the "front side" of the optical film, and a viewer side corresponds to the "back side" of the optical film. FIG. 1 illustrates an embodiment of the optical film for eyewear according to the present disclosure. An optical film 8 illustrated in FIG. 1 includes a first light control layer 2, a light reflection layer 1, a second light control layer 3, and a linear polarization element layer 4, which are laminated in this order with a bonding layer 7 interposed therebetween. The bonding layer 7 is made of a bonding agent or an adhesive agent. In FIG. 1, the layers forming the optical film 8 are laminated with the bonding layer 7 interposed therebetween, but the first light control layer 2, the light reflection layer 1, the second light control layer 3, and the linear polarization element layer 4 may be directly laminated. When the optical film 8 illustrated in FIG. 1 is applied to eyewear, the linear polarization element layer 4 is arranged on the back side of the optical film 8, and the first light control layer 2 is arranged on the front side of the optical film 8.

(Light Reflection Layer)

The light reflection layer used in the present disclosure includes the cholesteric liquid crystal layer that reflects left-handed circularly polarized light or right-handed circularly polarized light in a visible light range. Circularly polarized light is roughly divided into two kinds. Clockwise circularly polarized light is referred to as right-handed circularly polarized light, and counterclockwise circularly polarized light is referred to as left-handed circularly polarized light. Since circularly polarized light has no polarization axis, high reflectance can be easily and stably obtained only by selecting either right-handed circularly polarized light or left-handed circularly polarized light as a circularly polarized light reflected by the light reflection layer. When the optical film for eyewear according to the present disclosure includes two or more light reflection layers, the two or more light reflection layers both preferably have a property of reflecting circularly polarized light in an identical direction. For example, when three cholesteric liquid crystal layers that each reflect left-handed circularly polarized light are laminated as light reflection layers, the three cholesteric liquid crystal layers all have a property of reflecting left-handed circularly polarized light. The number of laminated light reflection layers is not particularly limited, but is preferably one to five, more preferably one to three. When a plurality of light reflection layers are provided, an optical film having various reflection colors can be obtained, but the number of laminated light reflection layers is preferably in the range of one to five from viewpoints of, for example, the number of manufacturing processes and cost. The thickness of each light reflection layer is preferably 0.2 to 5 µm, more preferably 0.8 to 4 µm. When the thickness of each light reflection layer is smaller than 0.2 µm, the reflectance of a light reflection film formed by the light reflection layers potentially decreases. When the thickness of each light reflection layer is larger than 5 µm, defect occurs in orientation of cholesteric liquid crystals included in the light reflection layer, and the haze value of a light reflection film formed by the light reflection layers potentially increases.

The haze value of a light reflection film formed by laminating three or more light reflection layers is preferably equal to or smaller than 1.0%, more preferably equal to or smaller than 0.8%. When the haze value is larger than 1.0%, the light reflection film has a large opacity, and is not suitable for application to an optical member for which transparency is important.

The cholesteric liquid crystal layer is formed of a nematic liquid crystal having chirality, or a composition obtained by adding a chiral agent to a nematic liquid crystal. Helical orientation and reflected wavelength can be optionally designed by selecting the kind and amount of the chiral agent, and thus it is preferable to employ a method of obtaining a cholesteric liquid crystal by adding a chiral agent to a nematic liquid crystal. Unlike a liquid crystal that operates in an electric field, the nematic liquid crystal in the present disclosure is used while the helical orientation thereof is fixed, and thus it is preferable to use a nematic liquid crystal monomer containing a polymerizable group.

The nematic liquid crystal monomer containing a polymerizable group is a compound containing the polymerizable group in a molecule and having liquid crystallinity in a certain temperature range or a certain concentration range. Examples of the polymerizable group include a (meth) acryloyl group, a vinyl group, a chalconyl group, a cinnamoyl group, and an epoxy group. It is preferable that a mesogenic group is contained in a molecule for a polymerizable liquid crystal to have liquid crystallinity. The mesogenic group is, for example, a rod-shaped or plate-shaped substituent group such as a biphenyl group, a terphenyl group, a (poly)phenyl benzoate group, a (poly)ether group, a benzylideneaniline group, and an acenaphthoquinoxaline group, or a disk-shaped substituent group such as a triphenylene group, a phthalocyanine group, and an azacrown group. Thus, the mesogenic group is a group capable of inducing liquid crystal phase behavior. A liquid crystal compound containing a rod-shaped or plate-shaped group is known as a calamitic liquid crystal in the present technical field. Examples of nematic liquid crystal monomers containing such a polymerizable group include polymerizable liquid crystals disclosed in Japanese Patent Application Laid-Open No. 2003-315556 and Japanese Patent Application Laid-Open No. 2004-29824, Paliocolor (registered trademark) series (manufactured by BASF Ltd.) such as Paliocolor LC242 and Paliocolor LC1057, and RMM series (manufactured by Merck KGaA). These nematic liquid crystal monomers containing a polymerizable group may be used alone or may be used in combinations of two or more.

The chiral agent is preferably a compound that is capable of causing right-handed or left-handed helical orientation of the above-described nematic liquid crystal monomer containing a polymerizable group and contains a polymerizable group like the nematic liquid crystal monomer containing a polymerizable group. Such a chiral agent is, for example, Paliocolor LC756 (manufactured by BASF Ltd.), an optically active compound each having a binaphthyl structure, which is disclosed in, for example, Japanese Patent Application Laid-Open No. 2002-179668 or Japanese Patent Application Laid-Open No. 2007-271808, or an optically active compound having an isosorbide structure disclosed in, for example, Japanese Patent Application Laid-Open No. 2003-306491, or Japanese Patent Application Laid-Open No. 2003-313292. The direction of circularly polarized light to be reflected is determined by the kind of the chiral agent, and the reflected wavelength of a light reflection layer can be changed in accordance with the amount of the chiral agent added to nematic liquid crystal. For example, a light reflection layer that reflects light having a wavelength on a shorter wavelength side can be obtained by increasing the amount of the added chiral agent. The amount of the added chiral agent differs depending on the kind and reflected wavelength of the chiral agent, but is preferably 0.5 to 30 parts by weight approximately based on 100 parts by weight of the nematic liquid crystal monomer containing a polymerizable group, more preferably 1 to 20 parts by weight approximately, in order to adjust the central reflected wavelength of a light reflection layer to ordinary light to a desired wavelength region.

In addition, a polymerizable compound that can react with the nematic liquid crystal monomer containing a polymerizable group and has no liquid crystallinity may be added. Such a compound is, for example, ultraviolet curable resin. Examples of the ultraviolet curable resin include dipentaerythritol hexa(meth)acrylate, a reaction product of dipentaerythritol penta(meth)acrylate and 1,6-hexamethylene-di-isocyanate, a reaction product of isocyanuric-ring-containing tri-isocyanate and pentaerythritol tri(meth) acrylate, a reaction product of pentaerythritol tri(meth) acrylate and isophorone-di-isocyanate, dipentaerythritol penta(meth)acrylate, dipentaerythritol tetra(meth)acrylate, pentaerythritol tetra(meth)acrylate, pentaerythritol tri(meth) acrylate, trimethylolpropane tri(meth)acrylate, ditrimethylolpropane tetra(meth)acrylate, tris (acryloxyethyl)isocyanurate, tris (methacryloxyethyl)isocyanurate, a reaction product of glycerol triglycidyl ether and (meth)acrylic acid, caprolactone denaturation tris (acryloxyethyl)isocyanurate, a reaction product of trimethylolpropane triglycidyl ether and (meth)acrylic acid, triglycerol-di-(meth)acrylate, a reaction product of propylene glycol-di-glycidyl ether and (meth)acrylic acid, polypropylene glycol-di-(meth)acrylate, tripropylene glycol-di-(meth)acrylate, polyethylene glycol-di-(meth)acrylate, tetraethylene glycol-di-(meth)acrylate, triethylene glycol-di-(meth)acrylate, pentaerythritol-di-(meth)acrylate, a reaction product of 1,6-hexanediol-di-glycidyl ether and (meth)acrylic acid, 1,6-hexanediol-di-(meth)acrylate, glycerol-di-(meth)acrylate, a reaction product of ethylene glycol-di-glycidyl ether and (meth) acrylic acid, a reaction product of diethylene glycol-di-glycidyl ether and (meth)acrylic acid, bis (acryloxyethyl) hydroxyethyl isocyanurate, bis (methacryloxyethyl) hydroxyethyl isocyanurate, a reaction product of bisphenol A-di-glycidyl ether and (meth)acrylic acid, tetrahydrofurfuryl (meth)acrylate, caprolactone denaturation tetrahydrofurfuryl (meth)acrylate, 2-hydroxyethyl (meth)acrylate, 2-hydroxypropyl (meth)acrylate, polypropylene glycol (meth) acrylate, polyethylene glycol (meth)acrylate, phenoxy hydroxypropyl (meth)acrylate, acryloyl morpholine, methoxy polyethylene glycol (meth)acrylate, methoxy tetraethylene glycol (meth)acrylate, methoxy triethylene glycol (meth)acrylate, methoxy ethylene glycol (meth)acrylate, methoxy ethyl (meth)acrylate, glycidyl (meth)acrylate, glycerol (meth)acrylate, ethyl carbitol (meth)acrylate, 2-ethoxyethyl (meth)acrylate, N,N-dimethylaminoethyl (meth)acrylate, 2-cyanoethyl (meth)acrylate, a reaction product of butyl glycidyl ether and (meth)acrylic acid, butoxy triethylene glycol (meth)acrylate, and butanediol mono(meth)acrylate. These resins may be used alone or may be used as a mixture of some of the resins. These ultraviolet curable resins having no liquid crystallinity need to be added in such an amount that a composition containing the nematic liquid crystal monomer does not lose liquid crystallinity, and the amount added is preferably 0.1 to 20 parts by weight based on 100 parts by weight of the nematic liquid crystal monomer containing a polymerizable group, more preferably 1.0 to 10 parts by weight approximately.

When the above-described nematic liquid crystal monomer containing a polymerizable group or any other polymerizable compound is ultraviolet curable, a photopolymerization initiator is further added to the composition for ultraviolet curing. Examples of the photopolymerization initiator include: 2-methyl-1-[4-(methylthio)phenyl]-2-morpholinopropane-1 (Irgacure 907 manufactured by BASF Ltd.), 1-hydroxy cyclohexyl phenyl ketone (Irgacure 184 manufactured by BASF Ltd.), 4-(2-hydroxyethoxy)-phenyl (2-hydroxy-2-propyl) ketone (Irgacure 2959 manufactured by BASF Ltd.), 1-(4-dodecylphenyl)-2-hydroxy-2-methyl-propan-1-one (Darocure 953 manufactured by Merck KGaA), 1-(4-isopropylphenyl)-2-hydroxy-2-methylpropan-1-one (Darocure 1116 manufactured by Merck KGaA), 2-hydroxy-2-methyl-1-phenylpropan-1-one (Irgacure 1173 manufactured by BASF Ltd.), an acetophenone compound such as diethoxyacetophenone; benzoin compounds such as benzoin, benzoin methyl ether, benzoin ethyl ether, benzoin isopropyl ether, benzoin isobutyl ether, and 2,2-dimethoxy-2-phenylacetophenone (Irgacure 651 manufactured by BASF Ltd.); benzophenone compounds such as benzoyl-benzoic acid, methyl benzoylbenzoate, 4-phenylbenzophenone, hydroxybenzophenone, 4-benzoyl-4'-methyldiphenyl sulfide, and 3,3'-dimethyl-4-methoxybenzophenone (Kayacure MBP manufactured by Nippon Kayaku Co., Ltd.); and thioxanthone compounds such as thioxanthone, 2-chlorothioxanthone (Kayacure CTX manufactured by Nippon Kayaku Co., Ltd.), 2-methylthioxanthone, 2,4-dimethylthioxanthone (Kayacure RTX manufactured by Nippon Kayaku Co., Ltd.), isopropyl thioxanthone, 2,4-dichlorothioxanthone (Kayacure CTX manufactured by Nippon Kayaku Co., Ltd.), 2,4-diethylthioxanthone (Kayacure DETX manufactured by Nippon Kayaku Co., Ltd.), or 2,4-diisopropylthioxanthone (Kayacure DITX manufactured by Nippon Kayaku Co., Ltd.). The photopolymerization initiator is preferably, for example, Irgacure TPO, Irgacure TPO-L, Irgacure OXE01, Irgacure OXE02, Irgacure 1300, Irgacure 184, Irgacure 369, Irgacure 379, Irgacure 819, Irgacure 127, Irgacure 907, or Irgacure 1173 (all manufactured by BASF Ltd.), more preferably, Irgacure TPO, Irgacure TPO-L, Irgacure OXE01, Irgacure OXE02, Irgacure 1300, or Irgacure 907. These photopolymerization initiators may be used alone or may be used as a mixture of some of the initiators at an optional ratio. It is preferable to use at least one kind of a photopolymerization initiator having an absorption band at a wavelength equal to or longer than 300 nm.

When a benzophenone compound or a thioxanthone compound is used as the photopolymerization initiator, an auxiliary agent may be additionally used to promote optical polymerization reaction. Examples of such an auxiliary agent include amine compounds such as triethanolamine, methyldiethanolamine, triisopropanolamine, n-butylamine, N-methyldiethanolamine, diethylaminoethyl methacrylate, Michler's ketone, 4,4'-diethylamino phenone, ethyl 4-dimethylaminobenzoate, (n-butoxy)ethyl 4-dimethylaminobenzoate, and isoamyl 4-dimethylaminobenzoate.

The amounts of the photopolymerization initiator and the auxiliary agent added can be in such a range that the liquid crystallinity of the composition used in the present disclosure is not affected. The amount of the photopolymerization initiator added is preferably 0.5 to 10 parts by weight, more preferably 2 to 8 parts by weight approximately, based on 100 parts by weight of ultraviolet-curable compound in the composition. The amount of the auxiliary agent added to the composition is preferably 0.5 to 2 times larger than the mass of the photopolymerization initiator.

The following describes a method of producing the light reflection layer used in the present disclosure by using the above-described cholesteric liquid crystal. In such a method, for example, a necessary amount of a chiral agent causing right-handed or left-handed helical orientation is added to a nematic liquid crystal monomer containing a polymerizable group to reflect light having a desired wavelength. Subsequently, these are dissolved into a solvent, and then a photopolymerization initiator is added. Such a solvent is not particularly limited as long as the solvent dissolves the liquid crystal monomer and the chiral agent in use and the like. The solvent is, for example, cyclopentanone, toluene, methyl ethyl ketone, or methyl isobutyl ketone, and is preferably, for example, cyclopentanone or toluene. Thereafter, this solution is coated on a plastic film such as a triacetylcellulose (TAC) film, an acrylic film, a polycarbonate film, a polyvinyl chloride film, a polyolefin film, or a polyethylene terephthalate (PET) film so that the thickness thereof is uniform as possible, and then is left to stand for a constant time under such a temperature condition that cholesteric liquid crystal is obtained on the plastic film and oriented at a desired helical pitch, preferably at 40 to 150° C. while the solvent is removed by heating. In this case, when orientation processing such as rubbing or stretching is performed on the surface of the plastic film before the coating, the cholesteric liquid crystal can be more uniformly oriented, and the haze value as the film can be reduced. Subsequently, while this orientation state is held, the film is irradiated with ultraviolet from, for example, a high-pressure mercury lamp to fix the orientation of the cholesteric liquid crystal, thereby obtaining the cholesteric liquid crystal layer forming the light reflection layer used in the present disclosure. When a chiral agent that causes right-handed helical orientation is selected, the light reflection layer is a light reflection layer R that selectively reflects right-handed circularly polarized light. When a chiral agent that causes left-handed helical orientation is selected, the light reflection layer is a light reflection layer L that selectively reflects left-handed circularly polarized light. This phenomenon that particular circularly polarized light is selectively reflected is referred to as selective reflection, and a selectively reflected wavelength band is referred to as a selective reflection region.

Since the light reflection layer has a reflection band, the reflected wavelength of the light reflection layer is expressed by using a central reflected wavelength as the central value of the reflection band. The central reflected wavelength means the central wavelength of the reflection band of the light reflection layer, and has a value, for example, at middle between wavelengths on the short wavelength side and the long wavelength side at which the transmittance is 75% in the reflection band in spectrometry. For example, when spectrometry of a light reflection layer obtains the wavelength of 500 nm on the short wavelength side and the wavelength of 600 nm on the long wavelength side, at which the transmittance is 75% in the reflection band, the central reflected wavelength of this light reflection layer is 550 nm. The transmittance used as a reference in calculation of the central reflected wavelength is optional and selected as appropriate depending on, for example, a waveform shape and the lowest transmittance of the reflection band. The waveform is not necessarily bilaterally symmetric. The transmittance of the lowest transmittance value +5 to 30% may be used as a reference because an interference band exists near the reflection band in some cases. When the optical film according to the present disclosure is applied to sunglasses, the central reflected wavelength of a light reflection layer is in the visible light range so that reflected light has a metallic color tone. The central reflected wavelength is preferably the range of 400 to 800 nm, more preferably the range of 410 to 780 nm, still more preferably the range of 430 to 700 nm. The central reflected wavelength in the visible light range at which the light reflection layer reflects left-handed circularly polarized light or right-handed circularly polarized light is selected as appropriate in accordance with a desired color tone. For example, the reflected light of the optical film has a metallic blue color for the central reflected wavelength of 450 nm, a metallic green color for the central reflected wavelength of 550 nm, and a metallic red color for the central reflected wavelength of 650 nm.

The light reflection layer may be any one of the light reflection layer R and the light reflection layer L. When a plurality of the light reflection layers are provided, each light reflection layer may be any one of the light reflection layer R and the light reflection layer L, but preferably all light reflection layers reflect circularly polarized light in an identical direction, in other words, they are either the light reflection layer R or the light reflection layer L. When the light reflection layer R and the light reflection layer L are both used in application of the optical film according to the present disclosure to eyewear, the light control layers cannot perform polarization conversion in an identical direction. In other words, the second light control layer performs conversion into linearly polarized light including both of s-polarized light and p-polarized light, which potentially leads to a reduced antiglare effect, and thus degrades the function of polarization sunglasses. When a difference between the central reflected wavelengths of the selective reflection regions of the light reflection layers is equal to or smaller than 20 nm while the light reflection layer R and the light reflection layer L are both provided, the reduction of the antiglare effect can be minimized irrespective of conversion into linearly polarized light including both of s-polarized light and p-polarized light at the second light control layer, and thus the eyewear can be used as polarization sunglasses. Thus, in such a case, both the light reflection layer R and the light reflection layer L can be provided.

In an example in which two or more light reflection layers are used, the light reflection layer R having a central reflected wavelength of 550 nm and the light reflection layer R having a central reflected wavelength of 650 nm are combined and laminated. With this configuration, right-handed circularly polarized light near 550 nm and right-handed circularly polarized light near 650 nm can be both reflected, and reflected light having a golden color can be obtained. Combination of the central reflected wavelengths of such light reflection layers is not particularly limited, and complicated and various kinds of reflection colors can be obtained in accordance with a desired combination.

When a plurality of light reflection layers are provided, the method of laminating the light reflection layers is not particularly limited. The light reflection layers may be directly laminated, but preferably laminated by using an adhesive agent or a bonding agent. The adhesive agent is an acrylic or rubber adhesive agent, but is preferably the acrylic adhesive agent, which allows easy adjustment of bonding and holding properties. The bonding agent is an ultraviolet curable resin composition or a heat curable resin composition. When the bonding agent is an ultraviolet curable resin, a composition as a mixture of two or more monomers containing an acryloyl group or an epoxy group can be cured through ultraviolet irradiation together with a photopolymerization initiator, thereby achieving bonding between the light reflection layers. When the bonding agent is a heat curable resin composition, a composition as a mixture of two or more monomers containing an epoxy group can be cured through heating together with an acid catalyst, thereby achieving bonding between the light reflection layers. Alternatively, a composition of two or more monomers or polymers containing an amino group, a carboxyl group, or a hydroxyl group can be cured through heating together with a compound containing an isocyanate group or melamine, thereby achieving bonding between the light reflection layers.

(Linear Polarization Element Layer)

In the optical film for eyewear according to the present disclosure, the linear polarization element layer is further laminated on the light control layers with the light reflection layers interposed therebetween. Specifically, when the optical film is applied to eyewear, the linear polarization element layer is provided on the second light control layer side, in other words, on the most back side (the viewer side) of the optical film. A linear polarization element included in the linear polarization element layer is not particularly limited, but is typically a polyvinyl alcohol (PVA) polarization film. The method of manufacturing the linear polarization element is not particularly limited, but the linear polarization element may be manufactured by, for example, adsorbing a dichromatic pigment to a polymer film formed of polyvinyl alcohol or derivative thereof and subsequently uniaxially stretching the film to orient the dichromatic pigment. The dichromatic pigment may be, for example, a well-known iodine complex or a dichromatic dye, but is preferably a dichromatic dye in terms of thermal resistance, particularly, a direct dye made of an azo dye containing a sulfonate group.

It is known that light reflected at, for example, a water surface, a road surface, or a snow surface contains a large amount of a linearly polarized light component, typically called s-polarized light, oscillating in a direction orthogonal to the entrance surface. In the optical film for eyewear according to the present disclosure, incident s-polarized light is absorbed by the linear polarization element arranged on the back side of the optical film. Thus, the absorption axis of the linear polarization element is preferably arranged so that the polarization axis of s-polarized light incident on the optical film for eyewear is parallel to the absorption axis of the linear polarization element.

(Light Control Layer)

In the optical film for eyewear according to the present disclosure, phase difference elements called quarter wave plates are used as the first light control layer and the second light control layer. The first light control layer and the second light control layer are arranged over each other so that the light reflection layer is sandwiched therebetween. When the optical film having such a configuration is applied to eyewear, the first light control layer is positioned on the front side of the optical film. A quarter wave plate used as a light control layer is a phase difference element having a function to convert circularly polarized light into linearly polarized light, and can be obtained by uniaxially stretching a film made of, for example, polycarbonate or cycloolefin polymer to have a phase difference equal to a quarter wavelength or by orienting horizontally oriented polymerizable liquid crystal with a thickness to have a phase difference equal to a quarter wavelength. This quarter wave plate may be used alone, or a phase difference element called wide band quarter wave plate may be used when a shift of the phase difference is large due to wavelength dispersion. The wide band quarter wave plate is a phase difference element with reduced wavelength dependency of the phase difference, and is, for example, a phase difference element obtained by laminating a half wave plate and a quarter wave plate having same wavelength dispersion so that the angle between the slow axes thereof is 60°, or a polycarbonate phase difference element (PURE-ACE WR-S manufactured by Teijin Limited, or R-film or RD film manufactured by KANEKA CORPORATION) with reduced wavelength dependency of the phase difference. The quarter wave plates forming the first light control layer and the second light control layer may be same or different.

When s-polarized light is incident on the first light control layer provided on the front side of the optical film, the first light control layer converts the s-polarized light into left-handed circularly polarized light or right-handed circularly polarized light. To allow the circularly polarized light converted from the s-polarized light by the first light control layer to be effectively reflected by the light reflection layer, the slow axis of the first light control layer is preferably arranged in a direction that the s-polarized light incident on the first light control layer is converted into circularly polarized light in a direction same as the direction of the circularly polarized light reflected by the light reflection layer. For example, when the light reflection layer R that reflects right-handed circularly polarized light is used as the light reflection layer, the arrangement direction of the slow axis of a quarter wave plate used as the first light control layer arranged on the front side of the optical film is set so that s-polarized light incident on the first light control layer can be converted into right-handed circularly polarized light. In this manner, the property of selective reflection of circularly polarized light that the light reflection layer has can be effectively used by controlling the arrangement direction of the slow axis of the first light control layer. Accordingly, s-polarized light incident on the optical film is effectively reflected, and as a result, the optical film achieves an increased antiglare effect. In addition, the slow axis of the second light control layer is preferably arranged in such a direction that circularly polarized light having transmitted through the light reflection layer is converted again into linearly polarized lights of either s-polarized light or p-polarized light oscillating in a direction parallel to the incident surface by a quarter wave plate as the second light control layer, and the absorption axis of the linear polarization element is preferably arranged in such a direction that the converted s-polarized light or p-polarized light is absorbed. Accordingly, the second light control layer can effectively convert the circularly polarized light having transmitted through the light reflection layer into linearly polarized light, thereby achieving an increase effect of absorption of linearly polarized light by the linear polarization element layer. As a result, the antiglare effect of the optical film is further increased. Although circularly polarized light transmitted through the light reflection film is converted into linearly polarized lights of either s-polarized light or p-polarized light by the second light control layer, whichever the circularly polarized light is converted into any of the linearly polarized light, the transmitted light of the optical film for eyewear of the present disclosure when natural light is incident becomes transmitted light of neutral hue. The transmitted light of neutral hue give natural light to eyes of an eyewear wearer, thereby color identification and the like is possible. When natural light is incident on the optical film for eyewear according to the present disclosure, circularly polarized light transmitted through the light reflection layer is converted into linearly polarized light only in the reflection band of the light reflection layer by the light reflection layer and the second light control layer. When the slow axis of the first light control layer is arranged in such a direction that s-polarized light incident on the first light control layer is converted into circularly polarized light in a direction same as that of circularly polarized light reflected by the light reflection layer, one of the converted linearly polarized light is orthogonal to the absorption axis of the linear polarization element, and thus either s-polarized light or p-polarized light of a specific wavelength is not absorbed by the linear polarization element. As a result, transmitted light having neutral hue reaches the eyewear wearer.

When the slow axis of the first light control layer is arranged so that incident light is converted into circularly polarized light in a direction opposite to that of circularly polarized light reflected by the light reflection layer, light shielded in the reflection band of the light reflection layer is transmitted. Thus, the eyewear wearer sees light transmitted through the optical film for eyewear as colored transmitted light.

The first light control layer and the second light control layer are preferably laminated in a positional relation that the slow axes of the quarter wave plates are orthogonal to each other so that incident s-polarized light and the absorption axis of the linear polarization element layer are parallel to each other. Accordingly, the effect of conversion of circularly polarized light into linearly polarized light by the second light control layer can be exploited as much as possible. Typically, commercially available polarization sunglasses are produced so that the absorption axis of the linear polarization element is parallel to the polarization axis of s-polarized light incident on the polarization sunglasses to absorb s-polarized light as main reflected light from, for example, a road surface. Also in the optical film for eyewear according to the present disclosure, optical film for eyewear which has an excellent s-polarized light absorption characteristic of the linear polarization element layer can be obtained by laminating the first light control layer and the second light control layer so that the linear polarization element layer is in a similar arrangement relation, in other words, the slow axes of the quarter wave plates are orthogonal to each other. When s-polarized light incident on the optical film is converted, through the quarter wave plate as the first light control layer, into circularly polarized light in a direction opposite to that of circularly polarized light reflected by the light reflection layer, and the circularly polarized light transmitted through the light reflection layer is converted into s-polarized light again by the quarter wave plate as the second light control layer, the converted s-polarized light is absorbed by the linear polarization element in which the absorption axis is arranged coaxially with the polarization axis of the incident s-polarized light. Accordingly, degradation of light absorption performance of the optical film is reduced.

<Optical Laminate>

Figure 2:
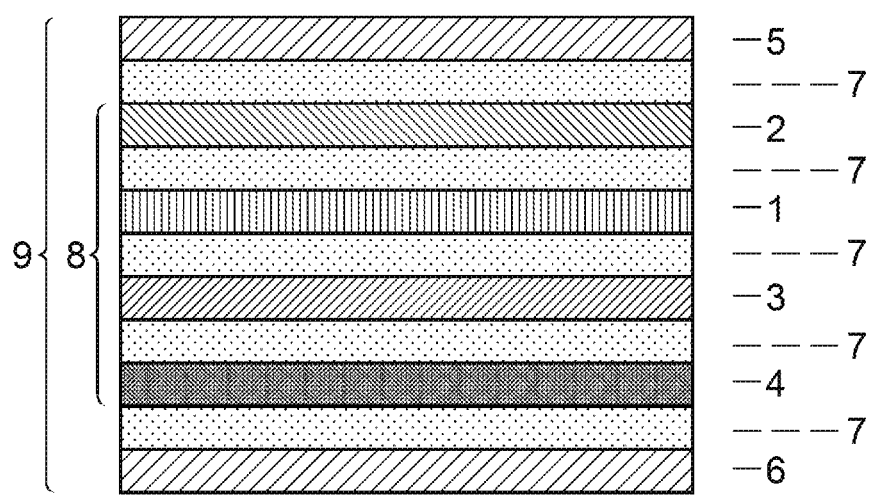
FIG. 2 is a side sectional view illustrating a representative embodiment of an optical laminate according to the present disclosure.

An optical laminate according to the present disclosure can be obtained by sandwiching the optical film for eyewear obtained as described above between two support bodies. FIG. 2 illustrates an embodiment of the optical laminate according to the present disclosure. In this optical laminate 9 illustrated in FIG. 2, the optical film 8 according to the present disclosure in which the first light control layer 2, the light reflection layer 1, the second light control layer 3, and the linear polarization element layer 4 are laminated in this order with the bonding layer 7 made of a bonding agent or an adhesive agent interposed therebetween is further sandwiched between a first support body 5 and a second support body 6 with the bonding layer 7 interposed therebetween. In other words, the optical laminate 9 according to the present disclosure includes the first support body 5, the second support body 6, and the optical film 8 arranged between the first support body 5 and the second support body 6. In FIG. 2, the layers forming the optical laminate 9 are laminated with the bonding layer 7 interposed therebetween, but the first light control layer 2, the light reflection layer 1, the second light control layer 3, the linear polarization element layer 4, the first support body 5, and the second support body 6 may be directly laminated. The second support body 6 may be arranged between the light reflection layer 1 and the linear polarization element layer 4. When the second support body 6 is arranged in this manner, advantage such as increased strength of the optical laminate can be obtained. In this case, the second support body 6 may be arranged between the light reflection layer 1 and the second light control layer 3, or may be arranged between the second light control layer 3 and the linear polarization element layer 4. When the optical laminate illustrated in FIG. 2 is applied to eyewear, the first support body 5 is arranged on a side on which light is incident on the optical laminate 9, in other words, the "front side" of the optical laminate, and the second support body 6 is arranged on the viewer side, in other words, the "back side" of the optical laminate. The quarter wave plate as the second light control layer 3 may function as the second support body 6. In such a case, the optical laminate 9 may have a configuration without the second support body 6.

The first support body and the second support body used in the present disclosure are preferably each a substrate made of a plastic material. Examples of the plastic material include resin such as polycarbonate, polyamide, and triacetylcellulose (TAC). In eyewear such as sunglasses and goggles, for which impact resistance and thermal resistance are requested, the support bodies are preferably made of polycarbonate, more preferably made of aromatic polycarbonate containing bisphenol A. In order to easily obtain visibility, the entire light beam transmittance of each support body is preferably equal to or higher than 70%, more preferably equal to or higher than 80%, still more preferably equal to or higher than 85%. At manufacturing of each layer of the optical film according to the present disclosure, when optimum processing temperature is low, the support bodies are preferably made of, for example, aromatic polycarbonate and PCC composition (wholly alicyclic polyester composition), or polyamide having a glass transition temperature of 130° C. or lower. The plastic materials of the first support body and the second support body may be identical or different.

The method of laminating the light reflection layer, the first and second light control layers, and the linear polarization element layer included in the optical film for eyewear according to the present disclosure and the method of sandwiching the optical film between the first and second support bodies are not particularly limited. For example, the layers and the support bodies may be directly laminated, but are preferably laminated with a bonding layer interposed therebetween to obtain high bonding power. The bonding layer may be made of any of a hot-melt bonding agent and a curable bonding agent. Typically, the curable bonding agent may be made of acrylic resin material, urethane resin material, polyester resin material, melamine resin material, epoxy resin material, or silicone material. An adhesive agent may be used in place of the bonding agent. The adhesive agent is not particularly limited, but may be, for example, acrylic adhesive agent or a rubber adhesive agent. Regarding the first and second light control layers, when the slow axis or fast axis of each of the quarter wave plates used as the first and second light control layers is angled at 45° relative to the longitudinal direction of the rolled quarter wave plate, the optical film including a quarter wave plate in which the slow axis or fast axis of which is angled at 45° relative to the longitudinal direction of the roll can be obtained by laminating the rolled quarter wave plate, the rolled light reflection layer, and the rolled linear polarization element layer through roll-to-roll processing.

The optical film for eyewear or the optical laminate according to the present disclosure thus obtained is arranged so that the first light control layer or the first support body is positioned on the outer side of the eyewear with respect to the viewer. Then, the optical film or the optical laminate is shaped into a desired shape appropriate for the eyewear and fixed to, for example, a frame, thereby obtaining eyewear such as sunglasses, goggles, or a helmet visor including the optical film for eyewear or the optical laminate according to the present disclosure. For example, in a case of sunglasses, the optical laminate is punched into a desired shape and then provided with bending. The bending is not limited to a particular method, but the optical laminate may be provided with bending into a spherical surface shape or an aspherical surface shape in accordance with a desired shape. A product obtained through the bending may be further provided with resin injection molding. This can prevent image distortion due to unevenness in the thickness of the optical laminate, and achieve particularly excellent effects on impact resistance, appearance, and eye fatigue of a lens with no focal position refractive power. The injected resin is preferably material same as that of a layer with which the resin contacts to prevent appearance degradation due to refractive index difference. For example, a hard coat and an antireflection film may be provided on the surface of the optical laminate as appropriate. Sunglasses can be obtained by fixing the optical laminate provided with the bending or the injection molding to a frame and the like through, for example, lens grinding, boring, and fastening by screw.

The optical film or the optical laminate thus obtained is also applicable to medical glasses. For example, when the central wavelength of the light reflection layer is equal to or shorter than 500 nm, the optical film for eyewear according to the present disclosure or the optical laminate using the optical film is effective for, for example, protective glasses having a function to reduce brightness after a cataract operation.

EXAMPLES

The present disclosure will be exemplarily described below in detail with reference to examples. In the examples, the word "parts" means "parts by weight". The present disclosure is not limited to the examples described below.

<Preparation of Cholesteric Liquid Crystal Coating Liquid>

Formulation examples 1 to 3 of cholesteric liquid crystal coating liquid having compositions listed in Table 1 were prepared.

TABLE 1

Composition table of coating liquid in Formulation examples 1 to 3

| Material (kind) | Material name (manu-facturer) | Amount added (parts by weight) | | |
|---|---|---|---|---|
| | | Formulation example 1 | Formulation example 2 | Formulation example 3 |
| Polymerizable liquid crystal monomer | LC242 (BASF) | 20.00 | 20.00 | 20.00 |
| Chiral agent | LC756 (BASF) | 1.43 | 1.22 | 1.09 |
| Photopoly-merization initiator | IrgacureTPO (BASF) | 1.00 | 1.00 | 1.00 |
| Solvent | Cyclopen-tanone | 80.00 | 80.00 | 80.00 |

Example 1

<Production of Light Reflection Layer>

Formulation example 1 of the cholesteric liquid crystal coating liquid was used to produce a light reflection layer through the following procedures. A used plastic film was a PET film (having the product name "A4100" and a thickness of 50 µm) manufactured by Toyobo Co., Ltd and including no basecoat layer provided with rubbing processing.

(1) Coating liquid of Formulation example 1 was coated on the PET film at room temperature by using a wire bar so that a film after drying had a thickness of 1.8 µm, thereby a coated film was formed.

(2) The obtained coated film was heated at 150° C. for five minutes to obtain a cholesteric liquid crystal phase with removing solvent. Then, the cholesteric liquid crystal layer was subjected to UV irradiation at power of 120 W for 5 to 10 seconds by a high-pressure mercury lamp (HX4000L; manufactured by HARISON TOSHIBA LIGHTING Corporation) to fix the cholesteric liquid crystal phase, thereby producing the light reflection layer.

In this manner, the light reflection layer R that reflects right-handed circularly polarized light was obtained. The reflection spectrum of the obtained light reflection layer R was measured by using spectrophotometer UV-3600 manufactured by Shimadzu Corporation to acquire the central reflected wavelength of selective reflection. The central reflected wavelength was 480 nm for the light reflection layer R.

<Preparation of Linear Polarization Element Layer and Light Control Layer>

As the linear polarization element for the linear polarization element layer, THC-13U (polarization degree: 99.9%, thickness: 215 µm) manufactured by Polatechno Co., Ltd was used. As the light control layers, two quarter wave plates of RD film-No140 (retardation value: 140 nm, average thickness: 58 µm) manufactured by KANEKA CORPORATION were used.

<Production of Optical Film for Eyewear>

(1) The light reflection layer and one of the light control layers (hereinafter also referred to as "light control layer A"), which were produced in the above-described manner, were laminated together by using an acrylic adhesive agent.

(2) Then, the PET film on the light reflection layer side was removed, and the light reflection layer on a side on which the light control layer A was not laminated and the other light control layer (hereinafter also referred to as "light control layer B") were laminated together by using an acrylic adhesive agent. The slow axes of the two light control layers A and B were orthogonal to each other. In this case, the slow axis of the light control layer A was arranged so that any incident s-polarized light was converted into right-handed circularly polarized light.

(3) The linear polarization element was arranged so that the absorption axis of the above-described linear polarization element was parallel to the polarization axis of incident s-polarized light, and the light control layer B on a side on which the light reflection layer was not laminated and the linear polarization element layer thus arranged were laminated together by using an acrylic adhesive agent.

In this manner, an optical film for eyewear in which the light control layer A, the light reflection layer, the light control layer B, and the linear polarization element were laminated in this order was produced.

Example 2

An optical film for eyewear was produced through a procedure similar to that in Example 1 except that coating liquid of Formulation example 2 was used in place of the coating liquid of Formulation example 1 and the coating was performed so that the film thickness after coating and drying was 2.0 µm in place of 1.8 µm.

The coating liquid of Formulation example 2 was used to produce the light reflection layer R that reflects right-handed circularly polarized light. Similarly to Example 1, the reflection spectrum of the obtained light reflection layer R was measured to acquire the central reflected wavelength of selective reflection. The central reflected wavelength of the light reflection layer R was 555 nm.

Example 3

An optical film for eyewear was produced through a procedure similar to that in Example 1 except that coating liquid of Formulation example 3 was used in place of the coating liquid of Formulation example 1 and the coating was performed so that the film thickness after coating and drying was 2.0 µm in place of 1.8 µm.

The coating liquid of Formulation example 3 was used to produce the light reflection layer R that reflects right-handed circularly polarized light. Similarly to Example 1, the reflection spectrum of the obtained light reflection layer R was measured to acquire the central reflected wavelength of selective reflection. The central reflected wavelength of the light reflection layer R was 620 nm.

Example 4

An optical film for eyewear was obtained through a procedure similar to that in Example 1 except that a three-layer light reflection layer R obtained by laminating the light reflection layers R obtained in Examples 1 to 3 by using an acrylic adhesive agent was used as the light reflection layer. The PET film was all removed at the lamination of the light reflection layer R.

Example 5

An optical film for eyewear was obtained through a procedure similar to that in Example 2 except that the linear polarization element was arranged so that the slow axes of the two light control layers A and B were parallel to each other and the absorption axis of the linear polarization element was orthogonal to the polarization axis of incident s-polarized light.

Example 6

An optical film for eyewear was produced through a procedure similar to that in Example 2 except that the slow axis of the light control layer A was arranged so that any incident s-polarized light was converted into left-handed circularly polarized light by the light control layer A.

Comparative Example 1

<Production of Light Reflection Layer>
The light reflection layer R was obtained through a procedure similar to that in Example 1.
<Preparation of Linear Polarization Element Layer>
Similarly to Example 1, THC-13U manufactured by Polatechno Co., Ltd. was used.
<Production of Optical Film>
The light reflection layer R and the linear polarization element layer thus obtained were laminated together by using an acrylic adhesive agent. After the lamination, the PET film of the light reflection layer R was removed, thereby producing an optical film for eyewear in which the light reflection layer and the linear polarization element were laminated together but none of the light control layers A and B were laminated.

Comparative Example 2

An optical film was produced through a procedure similar to that in Comparative Example 1 except that the light reflection layer R disclosed in Example 2 was used in place of the light reflection layer R in Comparative Example 1.

Comparative Example 3

An optical film was produced through a procedure similar to that in Comparative Example 1 except that the light reflection layer R disclosed in Example 3 was used in place of the light reflection layer R in Comparative Example 1.

Comparative Example 4

An optical film was produced through a procedure similar to that in Comparative Example 1 except that the light reflection layer R disclosed in Example 4 was used in place of the light reflection layer R in Comparative Example 1.

Comparative Example 5

An optical film for eyewear was produced through a procedure similar to that in Example 2 except that only the light control layer A (light control layer laminated on the front side of the optical film) was used without the light control layer B.

Comparative Example 6

An optical film for eyewear was produced through a procedure similar to that in Example 6 except that only the light control layer A was used without the light control layer B.

Comparative Example 7

An optical film for eyewear was produced through a procedure similar to that in Example 2 except that only the light control layer B (light control layer between the light reflection layer R and the linear polarization element layer) was used without the light control layer A.

[Method of Evaluating Characteristics]
<Central Reflected Wavelength and Minimum Transmittance of Light Reflection Layer>

In Examples and Comparative Examples, the transmittance of the obtained light reflection layer R was measured by using spectrophotometer UV-3600 manufactured by Shimadzu Corporation. The light source was a C light source. The average value of wavelengths at which spectral transmittance is 75% on the short wavelength side and the long wavelength side in the reflection band of the light reflection layer was used as the central reflected wavelength [nm]. The minimum value of the transmittance in the reflection band was used as the minimum transmittance [%]. In Example 4 and Comparative Example 4, since the three-layer light reflection layer was used, the central reflected wavelength was not calculated.

<Antiglare Effect of Optical Film for Eyewear>
In Examples and Comparative Examples, the transmittance of the obtained optical film for eyewear was measured by using spectrophotometer UV-3600 manufactured by Shimadzu Corporation, and a Y value was calculated according to JIS Z 8722:2009 and set to be a visible light average transmittance. The light source was a C light source. The measurement was performed by an absolute polarization method using an absolute polarization element having a polarization degree of 99.99%. In Examples 1 to 4 and 6 and Comparative Examples 1 to 7, the transmittance measurement was performed while the absorption axis of the linear polarization element layer of the optical film was set to be parallel to the polarization axis of s-polarized light emitted through the absolute polarization element. In Example 5, the transmittance measurement was performed while the absorption axis of the linear polarization element layer of the optical film was set to be orthogonal to the polarization axis of the s-polarized light. A lower visible light average transmittance indicates a higher antiglare effect. This measurement arrangement is similar to arrangement in a configuration used in actual polarization sunglasses or the like.

<Transmission Hue of Optical Film>
In Examples and Comparative Examples, the transmittance of the obtained optical film for eyewear was measured by using spectrophotometer UV-3600 manufactured by Shimadzu Corporation. The light source was a C light source. The obtained values of the transmittance were used to calculate a* value and b* value in L*a*b* color system according to JIS Z 8781-4:2013.

Figure 3:
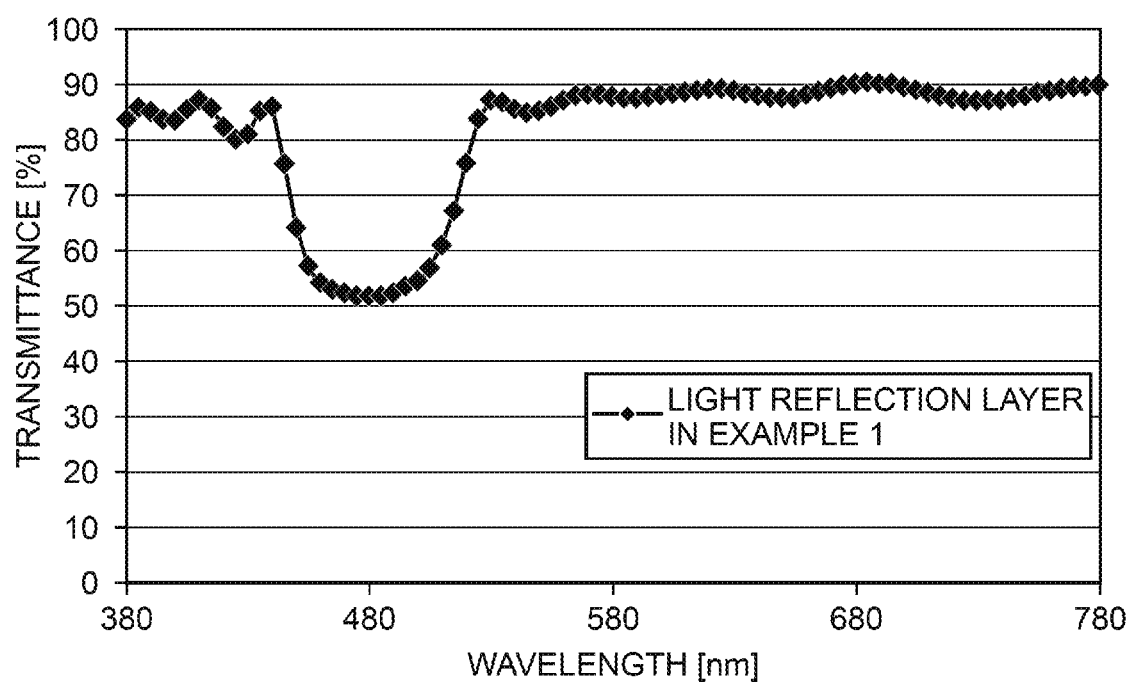
FIG. 3 illustrates spectrum data of the transmittance of a light reflection layer used in Example 1 and Comparative Example 1.
Figure 4:
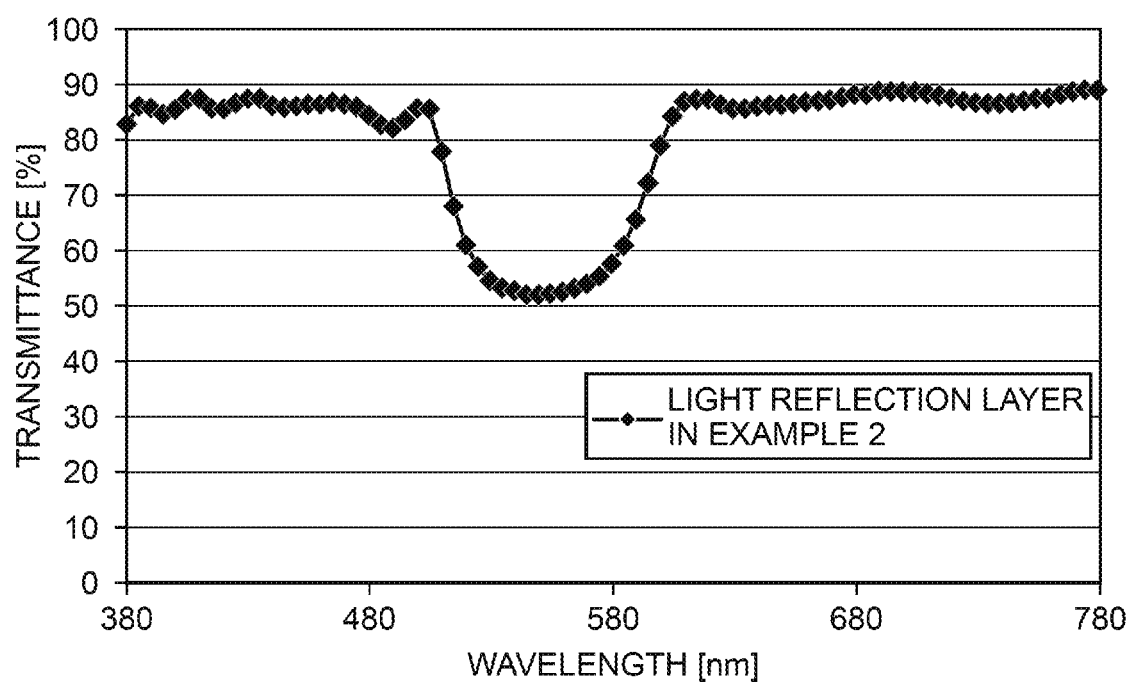
FIG. 4 illustrates spectrum data of the transmittance of a light reflection layer used in Examples 2, 5, and 6 and Comparative Examples 2, 5, 6, and 7.
Figure 5:
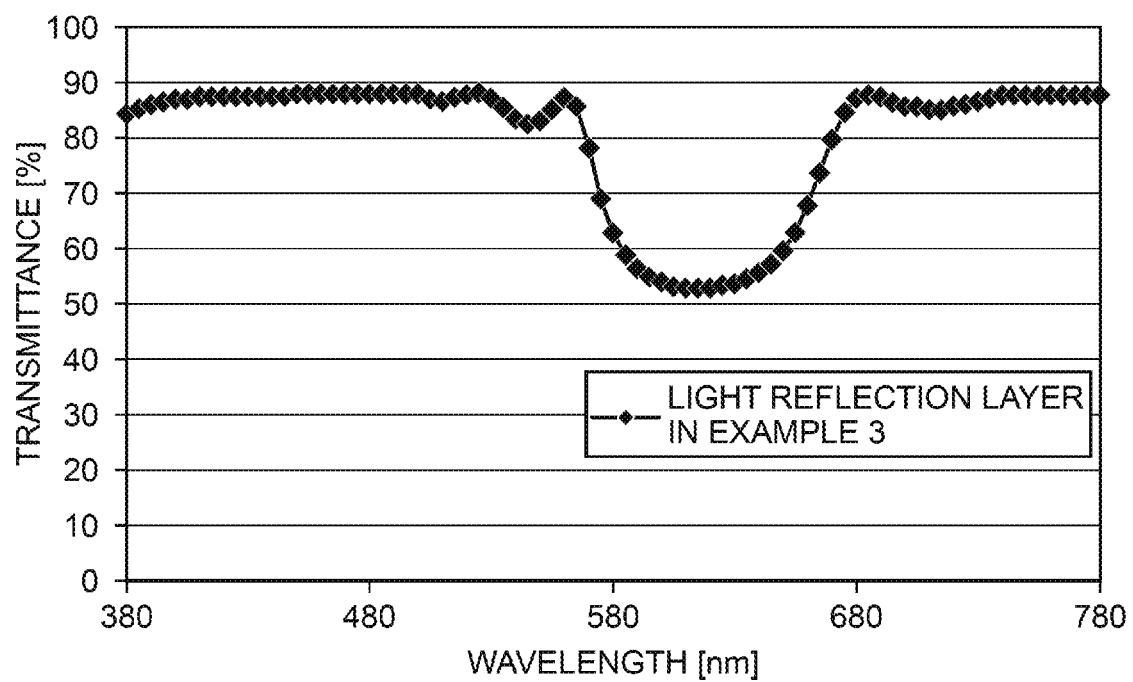
FIG. 5 illustrates spectrum data of the transmittance of a light reflection layer used in Example 3 and Comparative Example 3.
Figure 6:
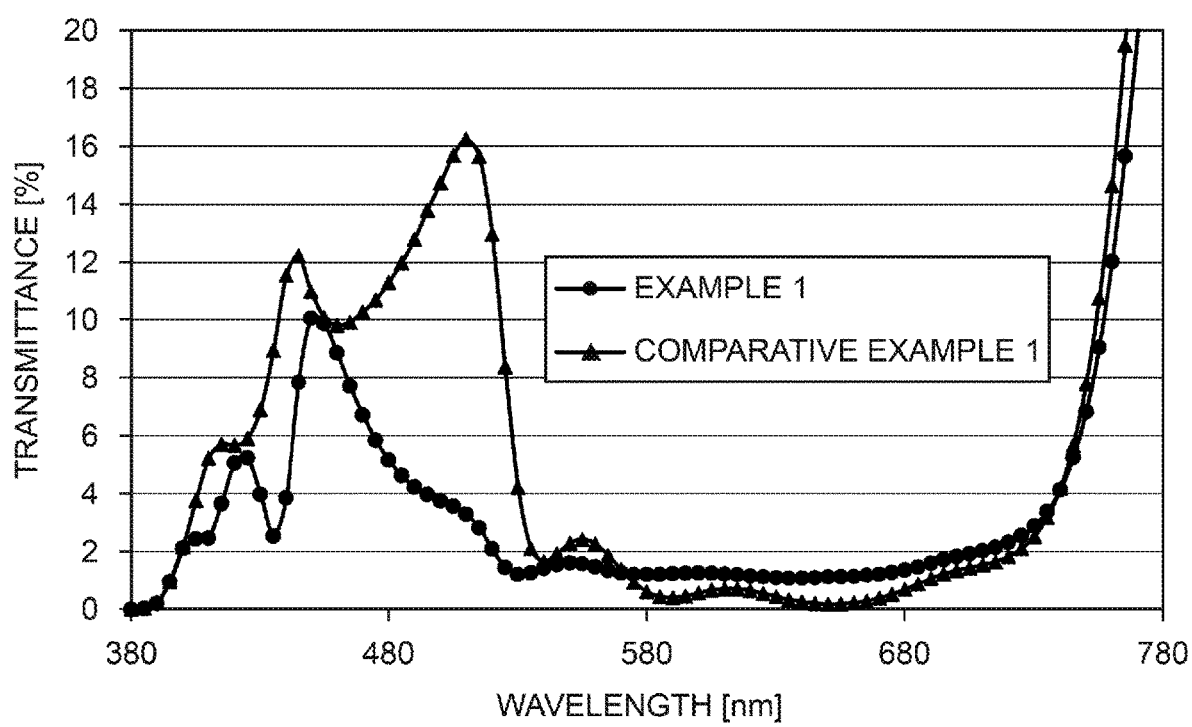
FIG. 6 illustrates spectrum data of the transmittance of each of an optical film in Example 1 and Comparative Example 1, the reflection color of which is blue.
Figure 7:
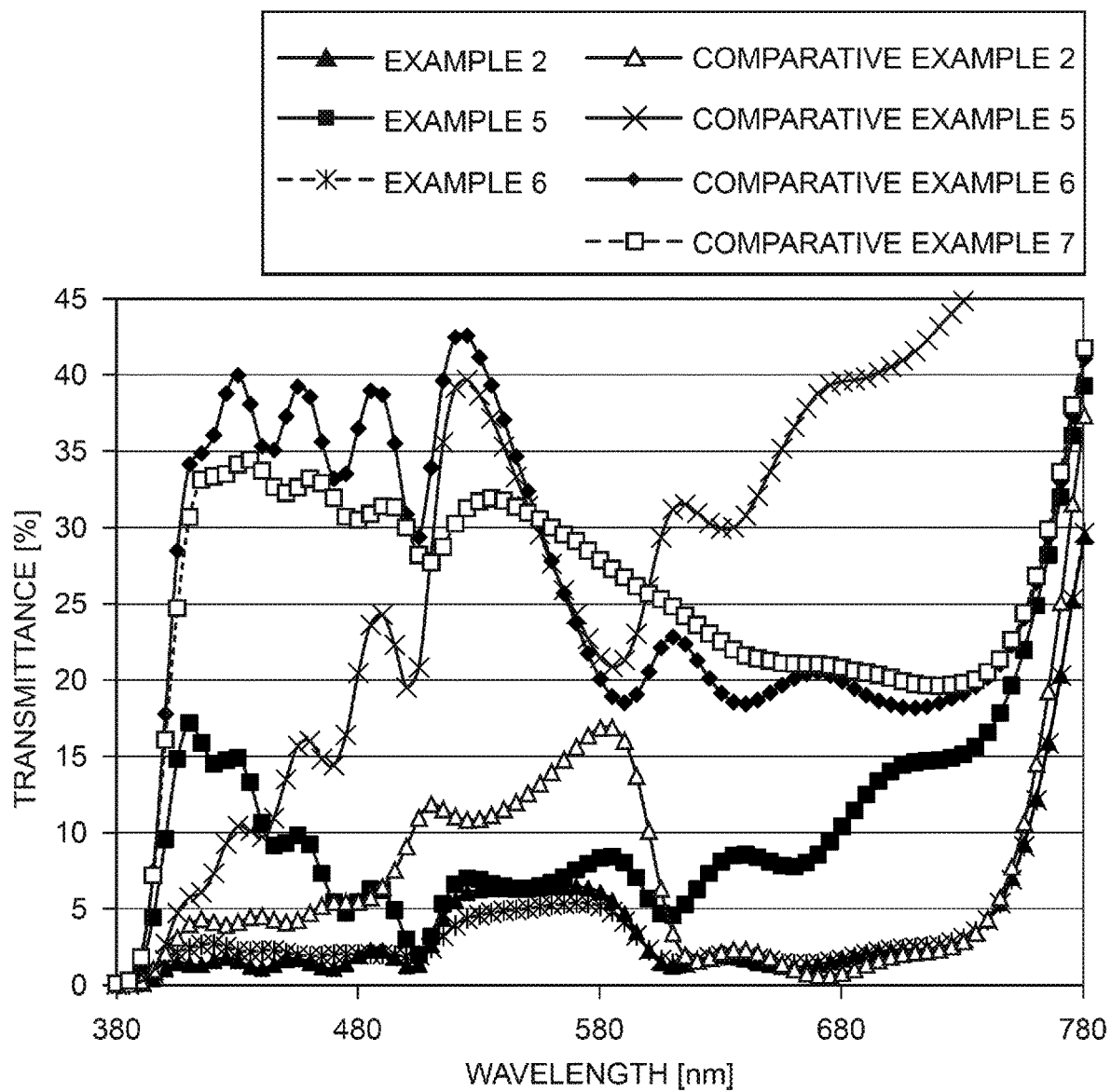
FIG. 7 illustrates spectrum data of the transmittance of each of an optical film in Examples 2, 5, and 6 and Comparative Examples 2, 5, 6, and 7, the reflection color of which is green.
Figure 8:
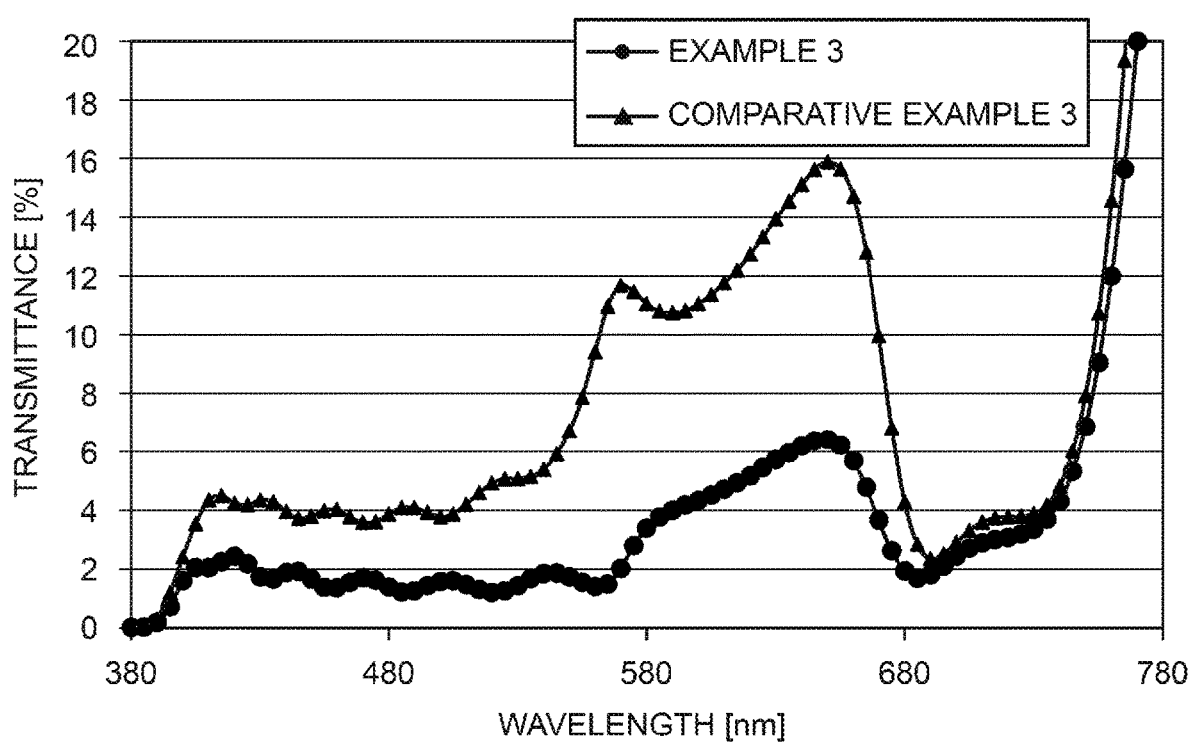
FIG. 8 illustrates spectrum data of the transmittance of each of an optical film in Example 3 and Comparative Example 3, the reflection color of which is orange.
Figure 9:
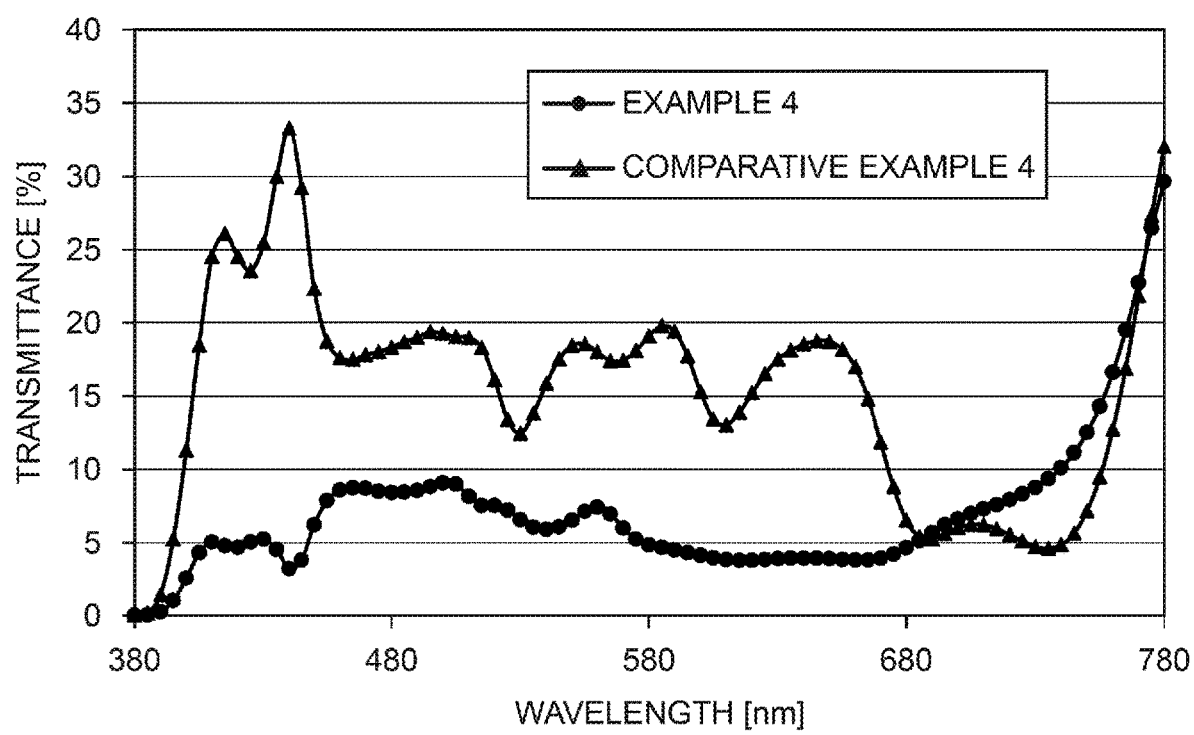
FIG. 9 illustrates spectrum data of the transmittance of an optical film in Example 4 and Comparative Example 4, the reflection color of which is silver.

Table 2 lists evaluation results in Examples 1 to 6, and Table 3 lists evaluation results in Comparative Examples 1 to 7. FIGS. 3 to 5 illustrate spectrum data of the transmittance of the light reflection layer produced in Examples 1 to 3, and FIGS. 6 to 9 illustrate spectral characteristics of the transmittance of each of the optical film produced in Examples 1 to 6 and Comparative Examples 1 to 7.

A and B are orthogonal to each other is applied to eyewear, the wearer of the eyewear can visually recognize transmitted light with neutral hue. Comparison between Examples 2 and 5 indicates that the optical films in Examples 2 and 5 both

TABLE 2

Evaluation results in examples 1 to 6

| | Item | Example 1 | Example 2 | Example 3 | Example 4 | Example 5 | Example 6 |
|---|---|---|---|---|---|---|---|
| Light reflection layer | Central reflected wavelength [nm] | 480 | 555 | 620 | — | 555 | 555 |
| | Minimum transmitance [%] | 51.6 | 52.5 | 52.7 | 52.5 | 52.5 | 52.5 |
| Optical film | Visible light average transmissivity [%] (antiglare property index) | 1.8 | 4.6 | 2.5 | 6.1 | 6.6 | 3.9 |
| | Transmission hue a* | −2 0 | −3.7 | −0.3 | 6.4 | −2.7 | 30.0 |
| | Transmission hue b* | 5.4 | 8.6 | 7.9 | −16.5 | 7.5 | −20.0 |
| | Light reflection color | Blue | Green | Orange | Silver | Green | Green |

TABLE 3

Evaluation results in comparative examples 1 to 7.

| | Item | Comparative example 1 | Comparative example 2 | Comparative example 3 | Comparative example 4 | Comparative example 5 | Comparative example 6 | Comparative example 7 |
|---|---|---|---|---|---|---|---|---|
| Light reflection layer | Central reflected wavelength [nm] | 480 | 555 | 620 | — | 555 | 555 | 555 |
| | Minimum transmittance [%] | 51.6 | 52.5 | 52.7 | 52.5 | 52.5 | 52.5 | 52.5 |
| Optical film | Visible light average transmissivity [%] (antiglare property index) | 4.1 | 11.1 | 8.3 | 17.1 | 26.7 | 29.9 | 28.8 |
| | Transmission hue a* | 3.1 | 9.8 | −11.3 | −1.1 | 6.8 | 6.6 | −3.3 |
| | Transmission hue b* | 12.0 | −7.2 | −0.9 | 1.1 | −7.6 | −7.2 | 7.9 |
| | Light reflection color | Blue | Green | Orange | Silver | Green | Green | Green |

The optical films in Examples 1 to 6 each exhibited a metallic color tone. Comparison between the optical films in Examples 1 to 6 and the optical films in Comparative Examples 1 to 6 in which no light control layers were included for each light reflection color found that the visible light average transmittances of the optical films for eyewear in Examples 1 to 6 had values lower than those of Comparative Examples 1 to 7 for any light reflection color. This indicates that the optical films in Examples 1 to 6 achieved improved antiglare effects as compared to those of the optical films in Comparative Examples 1 to 7. For example, comparison between the optical films in Examples 2, 5, and 6, the light reflection color of each of which is green, and the optical films in Comparative Examples 5 to 7, the light reflection color of each of which is green, found that the transmittances of the optical films in Examples 2, 5, and 6 had values lower than those of the optical films in Comparative Examples 5 to 7, in which only one light control layer is included. This indicates that the optical films in Examples 2, 5, and 6 achieved improved antiglare effects as compared to those of the optical films in Comparative Examples 5 to 7. Accordingly, each optical film according to the present disclosure exhibits a metallic color tone and is excellent in reduction of degradation of the antiglare effect due to circularly polarized light.

Additional comparison between Examples indicates that the optical films in Examples 2 and 6, the light reflection color of each of which is green, both achieve high antiglare effects, but a* value and b* value in transmission hue are both close to zero for the optical film in Example 2 as compared to the optical film in Example 6. Thus, when the optical film in which the slow axes of the light control layers achieve high antiglare effects, but the antiglare effect of Example 2 is higher than that of Example 5. Accordingly, an optical film for eyewear that is more excellent in reduction of degradation of the antiglare effect due to circularly polarized light can be obtained by arranging the light control layer A so that, when s-polarized light is incident on the optical film, the s-polarized light as linearly polarized light is converted, through the light control layer A on the front side of the optical film, into circularly polarized light in a direction same as that of circularly polarized light reflected by the light reflection layer.

An optical film and an optical laminate according to the present disclosure are capable of reducing degradation of an antiglare effect due to circularly polarized light even though a cholesteric liquid crystal layer is included and exhibits a metallic color tone, and thus are suitable for application to eyewear such as sunglasses, goggles, and a helmet visor.

What is claimed is:
1. An optical film for eyewear comprising a first light control layer, at least one light reflection layer, a second light control layer, and a linear polarization element layer in this order from an outer side with respect to a viewer,
    the light reflection layer including a cholesteric liquid crystal layer that reflects left-handed circularly polarized light or right-handed circularly polarized light in a visible light range; and
    the first light control layer and the second light control layer being each a quarter wave plate
    wherein the first light control layer and the second light control layer are laminated in a positional relation that slow axes of the quarter wave plates are orthogonal to each other.

2. The optical film for eyewear according to claim 1, wherein two or more light reflection layers are laminated and each of the two or more laminated light reflection layers reflects circularly polarized light in an identical direction.

3. The optical film for eyewear according to claim 1, wherein a slow axis of the first light control layer is arranged in a direction in which s-polarized light incident on the first light control layer is converted into circularly polarized light in a direction the same as the direction of circularly polarized light reflected by the light reflection layer.

4. An optical laminate comprising a first support body, a second support body, and the optical film for eyewear according to claim 1 arranged between the first support body and the second support body.

5. The optical laminate according to claim 4, wherein the first support body and the second support body are each a substrate made of a plastic material.

6. Eyewear comprising the optical film according to claim 1.

7. Eyewear comprising the optical laminate according to claim 4.

* * * * *